United States Patent
Klausner et al.

(10) Patent No.: US 7,363,149 B2
(45) Date of Patent: Apr. 22, 2008

(54) AUTONOMOUS IN-VEHICLE NAVIGATION SYSTEM AND DIAGNOSTIC SYSTEM

(75) Inventors: Markus Klausner, Wexford, PA (US); Arne Dietrich, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 272 days.

(21) Appl. No.: 10/017,093

(22) Filed: Dec. 13, 2001

(65) Prior Publication Data
US 2003/0114980 A1    Jun. 19, 2003

(51) Int. Cl.
*G01C 21/00* (2006.01)
*G06F 11/30* (2006.01)

(52) U.S. Cl. ............. 701/207; 701/29; 701/34; 702/182; 702/183

(58) Field of Classification Search ............. 701/29, 701/31, 33–36, 39, 43, 62–63, 76, 92, 97, 701/107, 207; 702/183–185, 188, 182; 340/825, 340/825.06, 825.16, 438
See application file for complete search history.

(56) References Cited

U.S. PATENT DOCUMENTS

| | | | |
|---|---|---|---|
| 5,416,712 A | | 5/1995 | Geier et al. |
| 5,508,594 A | * | 4/1996 | Underwood et al. ........ 318/139 |
| 5,892,927 A | * | 4/1999 | Boehmer et al. ............ 710/100 |
| 6,175,787 B1 | | 1/2001 | Breed |
| 6,289,332 B2 | * | 9/2001 | Menig et al. ................... 707/1 |
| 6,295,492 B1 | * | 9/2001 | Lang et al. .................... 701/33 |
| 6,380,890 B1 | * | 4/2002 | Smith et al. ........... 342/357.09 |
| 6,493,629 B1 | * | 12/2002 | Van Bosch ................ 701/207 |
| 6,577,934 B2 | * | 6/2003 | Matsunaga et al. ........... 701/29 |
| 6,643,571 B2 | * | 11/2003 | Gotvall et al. ................ 701/33 |
| 6,677,854 B2 | * | 1/2004 | Dix ............................ 340/438 |
| 6,882,917 B2 | * | 4/2005 | Pillar et al. ................... 701/48 |
| 2002/0110146 A1 | * | 8/2002 | Thayer et al. |
| 2002/0156558 A1 | * | 10/2002 | Hanson et al. |

FOREIGN PATENT DOCUMENTS

| | | |
|---|---|---|
| DE | 196 38 324 | 11/1997 |
| DE | 197 28 083 | 2/1999 |
| WO | WO 2000/72463 | 11/2000 |

OTHER PUBLICATIONS

Thayer et al U.S. Appl. No. 60/268,254.*
Hanson et al U.S. Appl. No. 60/276,820.*
Gabler, U., "Temporary engagement", Traffic Technology International, pp. 100-101.
European Search Report for EP 02 07 9641.3, Date of Completion Aug. 4, 2006.

(Continued)

*Primary Examiner*—Yonel Beaulieu
(74) *Attorney, Agent, or Firm*—Kenyon & Kenyon LLP

(57) ABSTRACT

A method and system for a wireless interface to the electronics of an automotive vehicle for a remote application in the vehicle or within communication range of the vehicle. The remote application may be a navigation system using vehicle motion sensor data to provide or improve a navigation solution for the vehicle. In an alternative embodiment, the remote application is diagnostic software running on a handheld computer that evaluates vehicle systems in a diagnostics procedure.

19 Claims, 2 Drawing Sheets

OTHER PUBLICATIONS

English Language Abstract of DE 197 28 083.
English Language Abstract of DE 196 38 324.
European Search Report for EP 02 07 9641, Date of Completion Apr. 20, 2006.
Wunderlich H. et al., Jun. 13, 2000, "Opening Bluetooth For technical Tasks—Possibilities And challenges For Automotive Applications" Bluetooth Conference, pp. 1-16.

* cited by examiner

AUTONOMOUS IN-VEHICLE NAVIGATION SYSTEM AND DIAGNOSTIC SYSTEM

FIELD OF THE INVENTION

The present invention relates to an in-vehicle device for vehicle navigation and/or vehicle system diagnostics. More specifically, the present invention relates to an in-vehicle device that uses a wireless connection to a vehicle bus system to obtain real-time vehicle data useful in determining a position of the vehicle for use in a navigation system, and to obtain error codes from vehicle systems useful in diagnosing a vehicle system's status.

BACKGROUND INFORMATION

Access to in-vehicle electronics is known in the art. Access to in-vehicle electronics currently requires special hardware that is connected directly to the vehicle bus through some physical connection. Traditional built-in in-car navigation systems use vehicle data such as wheel speed and steering angle to extrapolate from a former navigation solution. In the case of a satellite-based positioning system, for instance GPS (Global Positioning System), if there is no GPS signal available, the current navigation solution is approximated by using the vehicle data to extrapolate from the last-received (or former) GPS position. Internal vehicle data increases both precision and coverage of the navigation solution. Diagnostics systems use vehicle data obtained from a vehicle bus to assist an automotive technician in diagnosing and repairing vehicle systems.

There are several inherent problems with the current method of accessing in-vehicle electronic information for the purpose of improving a navigation solution or for the purpose of vehicle diagnostics. One problem is the cost of creating a hardwire connection from the vehicle bus to a navigation system or a handheld computer. For the case of the navigation system, this cost is due in part to the fact that most navigation systems are currently installed in the after-market. For the case of vehicle diagnostics, this cost is due in part to the fact that most diagnostic systems are only installed temporarily. Therefore, each installation is essentially a custom job, requiring a relatively large amount of time from an experienced automobile technician. Additionally, it may be difficult to find a connection to the vehicle bus if the automobile technician is not entirely familiar with the layout of the car, adding to the total time expended.

Another problem with the current method of attachment to the in-vehicle electronics is the flexibility provided by the vehicle bus connection. With the connector attached to the vehicle, the operator is often forced to use a specific navigation system, or a specific diagnostics computer, which the connector is designed to accommodate. A vehicle operator might want to use the navigation system (or vehicle diagnostics computer) outside the vehicle, and therefore the connection must be disconnectable. Additionally, the vehicle operator might want to upgrade or change the navigation system (or vehicle diagnostics computer) for the vehicle, possibly requiring a new connection to the vehicle bus, or a specialized adapter for the old bus connector. The uncertainty and non-uniformity in the connections to the vehicle bus have a substantial effect on the cost of both in-vehicle navigation systems and vehicle diagnostics systems, and have therefore had a profoundly negative effect on the use of in-vehicle navigation systems and vehicle diagnostics systems.

U.S. patent application Ser. No. 09/687,181 describes a system for providing short-range wireless access to data on vehicle buses and data in the memory of electronic control units (ECUs) via a wireless link. This application discusses interfacing a CAN (Controller Area Network) protocol on the vehicle bus communicating with a gateway node and Bluetooth hardware set.

Mobile navigation systems, as described in Gabler, U.: "Temporary engagement", Traffic Technology International, pp. 100-101, can consist of a handheld computer, a cell phone, and/or a GPS receiver. These systems, referred to as component-based mobile navigation systems (CBMNS), can be used both inside and outside a vehicle, in contrast to an in-vehicle navigation system, which is used exclusively within the vehicle.

While in-car navigation systems are an integral part of the vehicle, the component-based mobile navigation system uses less expensive components that may also be useful for functions other than navigation.

SUMMARY OF THE INVENTION

The present invention accesses a vehicle bus either for sensor data concerning vehicle motion for a navigation system, or for system health data for a vehicle diagnostic computer. By accessing vehicle data from a vehicle bus without the requirement of a physical connection, the system, method, and device of the present invention eliminate the above-mentioned problems and enable a navigation system to take advantage of vehicle sensor values to improve a position solution for the vehicle. The system, method, and device of the present invention also enable diagnostics information from the vehicle bus to be accessed at a remote terminal, thereby allowing the user to display and analyze vehicle diagnostics on a handheld computer or other appropriate unit.

A system for navigating a vehicle is provided including a vehicle sensor connected to a vehicle bus connected to a gateway node, and a processor in the vehicle communicating wirelessly with the gateway node and connected to a vehicle positioning system. The sensor measures a value and then transmits the value over the vehicle bus to the gateway node using a network protocol. The gateway node then wirelessly transmits the value to the processor using a wireless communication protocol. The processor receives an initial position from the positioning device and calculates a current position using a former position, the initial position, and the sensor value. A protocol translation device is disclosed that may include two different protocols and an intermediate, network-independent protocol. In one embodiment of the invention, an emerging worldwide standard, Bluetooth, created by the Wireless Personal Area Network (WPAN) Working Group (IEEE 802.15), provides a wireless interface to the electronics in the vehicle via a Controller Area Network (CAN). CAN is an international standard documented in ISO 11898 (for high-speed applications) and ISO 11519 (for lower-speed applications). A remote application, such as a navigation system or a hand-held computer running navigation software, can connect to this interface via a host inside the vehicle or within communication range of the vehicle.

According to an embodiment of the present invention, a protocol translation can occur from the Controller Area Network (CAN) protocol to the Bluetooth protocol in a gateway node electrically coupled to the vehicle bus. The signal can then be transmitted in the Bluetooth protocol from the gateway node to an external receiver via a wireless link.

Such an interface would enable external devices, such as a stand-alone navigation system or a handheld computer running navigation software and connected to a navigation system, to subscribe to certain signals on the vehicle bus, or to interrogate a vehicle's electronic control units (ECUs), without interfering with the vehicle's operation.

A system is also provided for monitoring an apparatus in a vehicle. The system includes a sensor for sensing an error code of the apparatus, a gateway node electrically coupled to the vehicle bus, and a processor. The processor may be situated within the vehicle, in proximity to the vehicle, or in long range wireless contact (e.g., by a cellphone connection) with the short range wireless hardware. The sensor, either in response to an interrogatory from a diagnostics software or on its own initiative, communicates the error code to the gateway node via the vehicle bus using a network protocol. The gateway node communicates the error code to the processor using a wireless communication protocol. The processor either displays the error code, uses a look-up table to analyze the error code, or stores the error code for retrieval at a later time.

U.S. patent application Ser. No. 09/687,181, the subject matter of which is expressly incorporated by reference herein, concerns a node in an in-vehicle bus network that comprises gateway functionality for passing messages from the in-vehicle bus to a remote host. The referenced application also concerns a wireless communication chipset for establishing, maintaining, and controlling a wireless link between the node and one or several remote hosts. The invention of the referenced application is described with CAN (Controller Area Network) as the in-vehicle communication protocol and Bluetooth as the short-range wireless communication standard.

DETAILED DESCRIPTION

Figure 1:
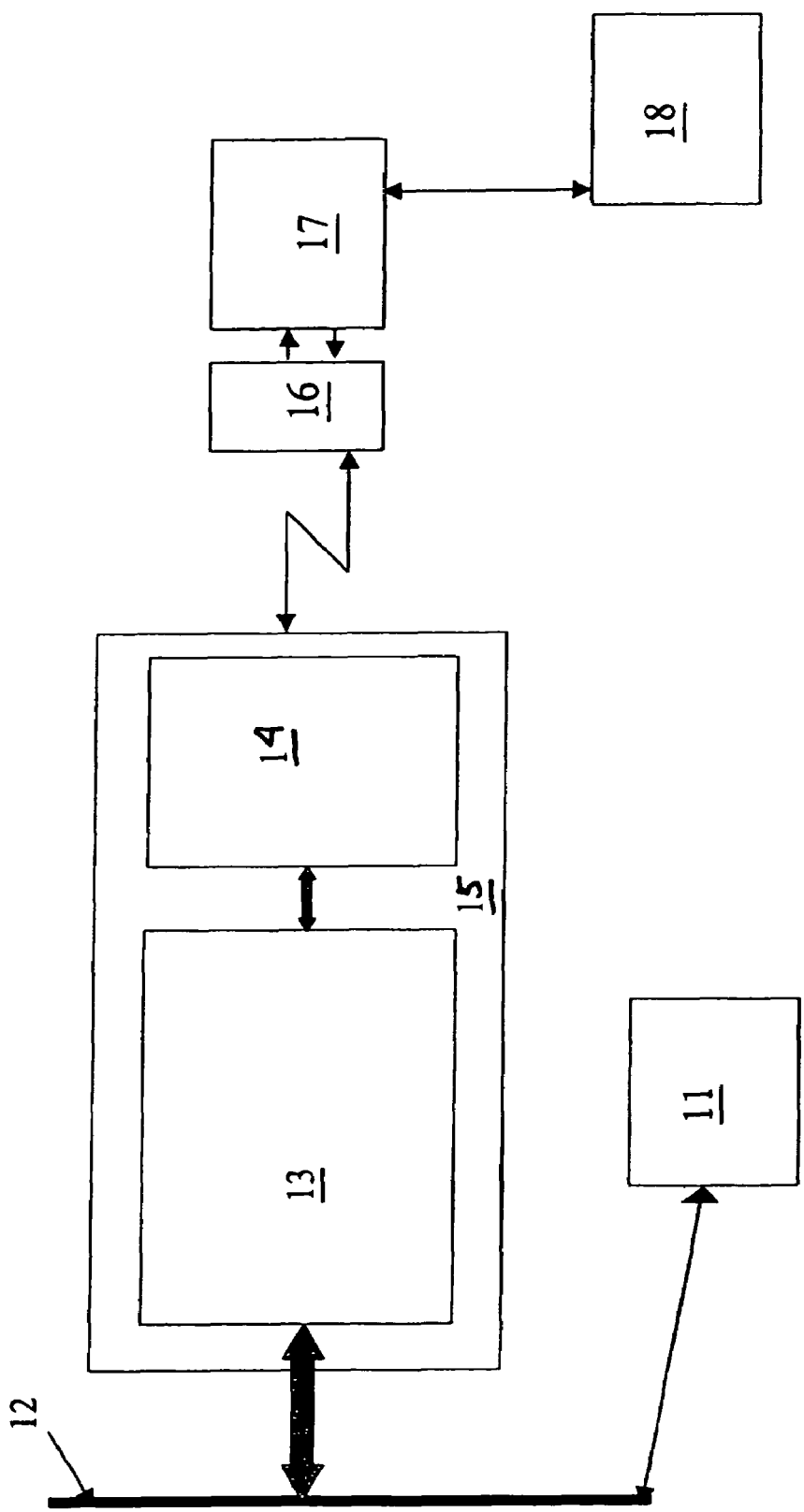
FIG. 1 shows a block diagram of a specific CAN-to-Bluetooth embodiment of the present invention.

FIG. 1 shows a block diagram of a specific CAN-to-Bluetooth embodiment of the present invention. Any wireless communication system, however, could be used to connect the vehicle sensor to the processor. FIG. 1 shows a sensor 11 electrically coupled to a vehicle bus 12. In one embodiment, the sensor data is used to assist in positioning the vehicle, and therefore any variable, both measured and observed (e.g. derived from other measured signals, using models), showing direction, change of direction, speed, acceleration, or deceleration, would be useful in the positioning calculation. Sensor 11 may therefore be a wheel speed sensor, a velocity sensor, a yaw rate sensor, a steering angle sensor, a body-slip angle sensor, an attitude sensor, an inertial sensor, or any other sensor for data concerning the status of a vehicle.

The vehicle bus 12 operates in one exemplary embodiment under a CAN (Controller Area Network) protocol. Vehicle bus 12 may be any one of several vehicle bus systems present in the vehicle. Vehicle bus 12 is electrically coupled to gateway node 15. In one exemplary embodiment, gateway node 15 is a CBGWN (CAN-Bluetooth gateway node). Gateway node 15, including controller 13 and Bluetooth hardware 14, is situated in the vehicle. Vehicle bus 12 couples directly to controller 13, which in turn is electrically coupled to Bluetooth hardware 14. The controller 13 controls the communication between the vehicle bus 12 and the Bluetooth hardware 14. In one exemplary embodiment, gateway node 15 is installed during production of the vehicle, thereby reducing the cost of providing sensor data to an aftermarket component (either navigational, diagnostic, or other).

Bluetooth hardware 14 communicates wirelessly with remote Bluetooth hardware 16. Remote Bluetooth hardware 16 is electrically coupled with processor 17. Processor 17 is electrically coupled to positioning device 18. Any of remote Bluetooth hardware 16, processor 17, and positioning device 18 may be integrated in one unit, or each may be a separate unit. Positioning device 18 may be a handheld computer running navigation software. Positioning device 18 may use any number of positioning methods to determine the current position and to monitor progress along the selected route. These positioning systems may include GPS, DGPS (Differential GPS), AGPS (Assisted GPS), triangulation, hyperbolic intersection of time-delay solutions, and cell identification to position the user.

Processor 17 may include a memory (not shown) used to store a former position. Processor 17 may use a current position from positioning device 18 along with a former position and a sensor datum or sensor data to calculate a corrected current position. This calculation may be important for providing reliable positioning information in an area of low-satellite coverage or no-satellite coverage (e.g. tunnels, parking garages, downtown areas), where the positioning device is a satellite-based positioning system. In areas with low- or no-satellite coverage, the quality of the current position output by the positioning device is reduced. Similarly, multipath problems may reduce the quality of either a satellite (e.g. GPS) positioning system or a cellphone-based system. By using sensor data to determine the movement of the vehicle with respect to the former position, an improved position solution is possible.

In the method according to the present invention, a signal from a sensor is provided to the vehicle bus. The signal may be output by any one of four wheel speed sensors, a steering angle sensor, a velocity sensor, a yaw rate sensor, a body-slip angle sensor, an attitude sensor, an inertial sensor, or any other sensor. A controller connected to the vehicle bus, for instance a CAN controller in the situation where the vehicle bus is operated as a Controller Area Network, reads the sensor data from the vehicle bus and communicates the data to a shortrange wireless transmitter, for instance a Bluetooth hardware set. The sensor data is transmitted wirelessly to another wireless transmitter that is incorporated in a component based mobile navigation system (CBMNS). The sensor data is then available at the processor that is running a navigation software. The navigation system is therefore able to use the vehicle motion sensor data to extrapolate from the former position stored in a memory. The extrapolated position can then be compared to current position data. The extrapolated position can then be averaged with the current position to solve for a corrected current position. Additionally, this averaging can be variably weighted depending on the quality of the current position data. For instance, the current position data may be heavily weighted when the quality of the current positioning data is high due to good or excellent satellite coverage. Alternatively, the extrapolated position may be more heavily weighted in the averaging process when the quality of the current positioning data is low, for instance when there is no- or low-satellite coverage.

In another embodiment, the sensor data is used in a diagnostic procedure to evaluate the vehicle systems. Sensor 11 may therefore also be any type of sensor evaluating another vehicle system or, alternatively, any system with self-diagnosing capabilities (i.e. any system capable of evaluating its own status). The data transmitted by sensor 11 in this exemplary embodiment would therefore be either an error or fault code, a health status, or an "all OK" signal. The error or fault code may be extracted from a look-up table by the sensor during the diagnostic procedure. Sensor 11 may transmit its status, in the form or any of the error or fault code, the health status, or the "all OK" signal, in response to an interrogatory from the diagnostic system communicated to the sensor 11 on the vehicle bus. Alternatively, sensor 11 may transmit its status on its own initiative, either upon sensing a fault, at a preset time, after a preset time interval, or upon commencing or completing a procedure (e.g. start-up).

The status of sensor 11 might be communicated to the vehicle bus 12, where the controller 13 could read the status off the bus and communicate it to Bluetooth hardware 14 (or any other appropriate short-range wireless transmitter). Bluetooth hardware 14 might transmit the status code to remote Bluetooth hardware set 16 (or another short-range wireless transmitter). Remote Bluetooth hardware set might communicate the status code to processor 17, which might be a handheld computer running a diagnostic program. Remote Bluetooth hardware set 16 may be incorporated with processor 17 in one integrated unit, or the two units may be separate but electrically coupled.

Processor 17 may be running a diagnostics program and the look-up table might be reproduced in processor 17, so that after receiving the error code, processor 17 would provide an error message to a user (not shown) indicating the sensor or system problem. Alternatively in this embodiment, a health status may be transmitted by sensor 11. The health status might indicate any of a healthy state, an unhealthy state, or a percentage or variably healthy state. Further in this embodiment, the sensor 11 may transmit simply an "all OK" signal. In the event a signal other than an "all OK" is transmitted, the processor may also communicate to a user a suggested course of conduct (e.g. "see a technician").

Remote Bluetooth hardware 16 and processor 17 may be permanently positioned in the vehicle, may be portable and therefore removable from the vehicle, or may be permanently positioned outside the vehicle. Some examples of situations where remote Bluetooth hardware 16 and processor 17 are permanently positioned outside the vehicle include being positioned for use in close proximity to the vehicle, such as in a service garage or home garage. In another embodiment, remote Bluetooth hardware 16 may be positioned within or close to the vehicle, and may be electrically coupled to a long range wireless transmitter (e.g. a cellphone, not shown). The cellphone connected to the Bluetooth hardware 16 may wirelessly communicate with processor 17 by any of various known methods, thereby providing remote diagnostic capabilities at any distance from the vehicle.

Figure 2:
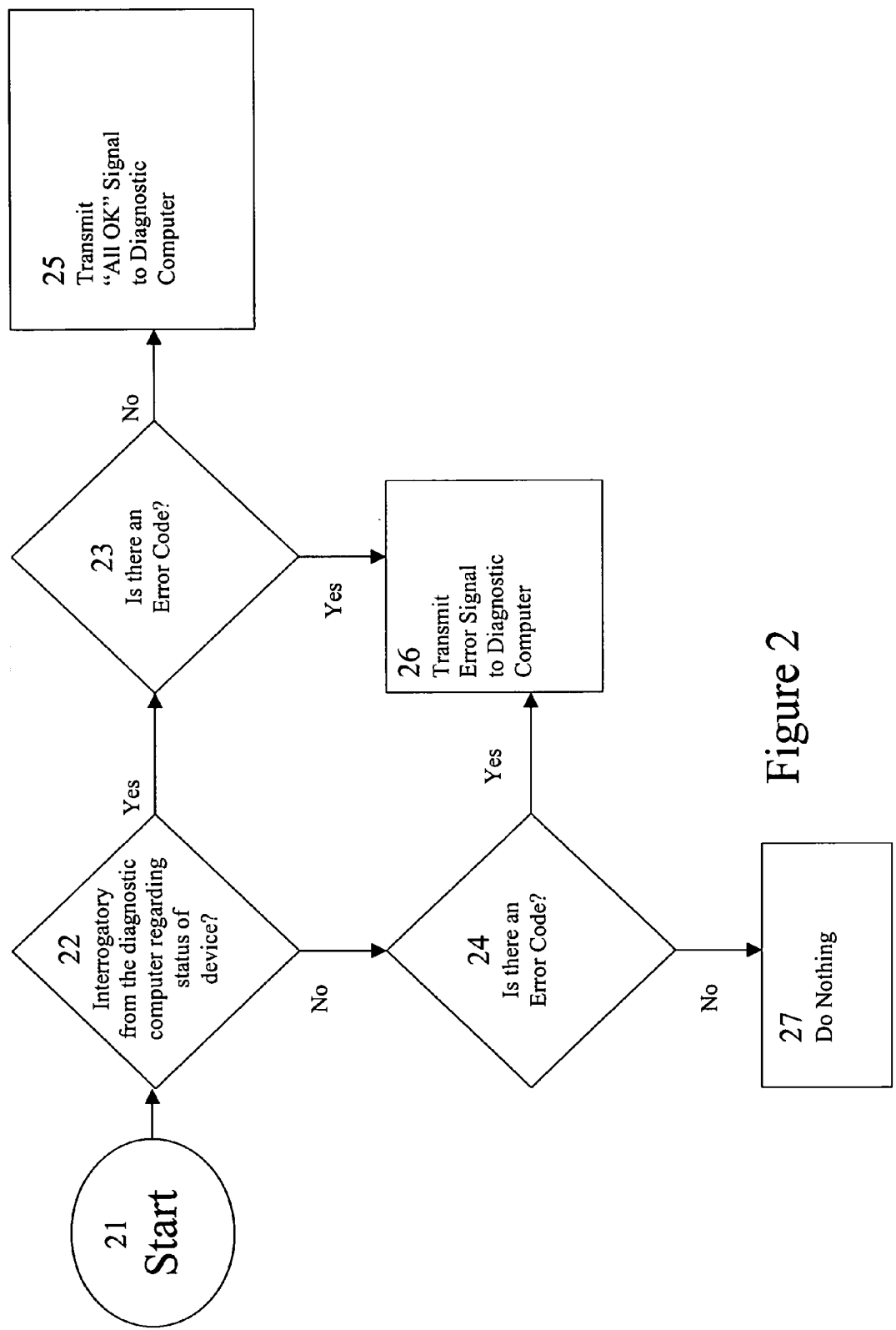
FIG. 2 shows a flow chart illustrating the method according to another embodiment of the present invention.

FIG. 2 illustrates a flowchart for the decision process of a diagnostic device according to the present invention starting in circle 21. The device determines if there has been an interrogatory from the diagnostic computer regarding status of the device in decision diamond 22. If the answer is "yes," the flow is to decision diamond 23, while if the answer is "no," the flow is to decision diamond 24. Decision diamond 23 asks whether there is an error code. If the answer is "no," the flow is to box 25, while if the answer is "yes," the flow is to box 26. Box 25 indicates an "all OK" signal is transmitted to the diagnostic computer. Box 26 indicates an error signal is transmitted to the diagnostic computer. Decision diamond 24 asks whether there is an error code. If the answer is "yes," the flow is to box 26, while if the answer is "no," the flow is to box 27. Box 26, as noted above, indicates an error signal is transmitted to the diagnostic computer. Box 27 indicates that no action is taken.

Although several embodiments are specifically illustrated and described herein, it will be appreciated that modifications and variations of the present invention are covered by the above teachings and within the purview of the appended claims without departing from the spirit and intended scope of the invention. In particular, though a Bluetooth hardware set using a Bluetooth protocol is illustrated in one exemplary embodiment, any short range wireless standard may be utilized in the present invention.

What is claimed is:

1. A system for monitoring at least one apparatus in a vehicle comprising:
    at least one sensor situated in the vehicle for sensing at least one error code of the at least one apparatus, the at least one sensor being electrically coupled to a vehicle bus;
    a gateway node situated in the vehicle, the gateway node being electrically coupled to the vehicle bus, the at least one sensor for communicating the at least one error code to the gateway node via the vehicle bus using a network protocol, the gateway node including a controller arrangement and a first wireless protocol arrangement, the first wireless protocol arrangement being coupled to the controller arrangement; and
    a processor, the gateway node communicating the at least one error code to the processor via a second wireless protocol arrangement that communicates with the first wireless protocol arrangement, using a wireless communication protocol;
    wherein:
        the at least one error code concerns diagnostics information and is accessible from the vehicle bus; and
        the at least one sensor interrogates the at least one apparatus for the at least one error code in response to receipt of a request from the processor, the request being made by the processor in response to a user input.

2. The system of claim 1, wherein the wireless communication protocol includes a Bluetooth protocol, the first wireless protocol arrangement includes a first Bluetooth hardware arrangement, and the second wireless protocol arrangement includes a second Bluetooth hardware arrangement.

3. The system of claim 2, wherein the network protocol includes a Controller Area Network protocol.

4. The system of claim 3, wherein the gateway node includes a Controller Area Network/Bluetooth gateway node.

5. The system of claim 1, wherein the at least one apparatus is at least one of a brake system, an engine system, an electrical system, and an auxiliary system.

6. The system of claim 1, further comprising:
    a cellphone communicator electrically coupled to the processor; and
    a remote application for communicating with the cellphone communicator via a cellphone base station;
    wherein the remote application is for receiving the at least one error code.

7. The system of claim 1, wherein the processor compares the at least one error code to a look-up table to determine a status code.

8. The system of claim 7, wherein the status code is communicated to a user.

9. The system of claim 8, wherein the status code is communicated to a user by at least one of a visual display unit and an audible signal.

10. The system of claim 1, wherein the processor is in a hand-held computer to enable a user to display and analyze vehicle diagnostics on the handheld computer.

11. A method for monitoring at least one apparatus in a vehicle, the method comprising:
sensing, with at least one sensor situated in the vehicle, at least one error code of the at least one apparatus, wherein the at least one sensor is electrically coupled to a vehicle bus that is also electrically coupled to a gateway node situated in the vehicle,
communicating, with the at least one sensor, the at least one error code to the gateway node via the vehicle bus using a network protocol, wherein the gateway node includes a controller arrangement and a first wireless protocol arrangement, and the first wireless protocol arrangement is coupled to the controller arrangement; and
communicating, from the gateway node to a processor, the at least one error code to the processor via a second wireless protocol arrangement that communicates with the first wireless protocol arrangement, using a wireless communication protocol;
wherein:
the at least one error code includes diagnostics information and is accessible from the vehicle bus; and
the sensing is performed in response to receipt of a request from the processor, the request being made by the processor in response to a user input.

12. The method of claim 11, further comprising:
comparing by the processor the at least one error code to a look-up table to determine a status code.

13. The method of claim 12, further comprising:
communicating the status code to a user.

14. The method of claim 13, further comprising:
communicating the status code to a user by at least one of a visual display unit and an audible signal.

15. The method of claim 11, wherein the wireless communication protocol includes a Bluetooth protocol, the first wireless protocol arrangement includes a first Bluetooth hardware arrangement, and the second wireless protocol arrangement includes a second Bluetooth hardware arrangement.

16. The method of claim 15, wherein the network protocol includes a Controller Area Network protocol.

17. The system of claim 1, wherein the at least one sensor:
interrogates the at least one apparatus for the at least one error code periodically; and
for each interrogation, responsive to a determination, based on a response to the respective interrogation, that no error code is available, provides an indication of the non-availability of the error code conditional upon the respective interrogation having been performed in response to the request.

18. A system for monitoring an apparatus in a vehicle comprising:
a sensor situated in the vehicle configured to receive an indication of an error status in the apparatus;
a bus electrically coupled to the sensor; and
a gateway node including a Controller Area Network (CAN) protocol controller and a first wireless protocol arrangement, the CAN controller being electrically coupled to the bus and to the first wireless protocol arrangement;
wherein:
the sensor is configured to:
interrogate the apparatus for the error status indication in response to a request from any of a plurality of diagnostic processors and on its own initiative;
if the error status indication indicates no error in the apparatus, provide the error status indication to the CAN controller conditional upon that the request was received by the sensor; and
if the error status indication indicates an error, provide the error status indication to the CAN controller regardless of whether the request was received by the sensor;
the error status indication is provided by the sensor to the CAN controller via the bus using a CAN protocol;
the CAN controller is configured to provide the error status indication to the first wireless protocol arrangement;
the first wireless protocol arrangement is configured for wireless communication in which to provide the error status indication to each of the plurality of diagnostic processors, the plurality of diagnostic processors being of different processor types, each diagnostic processor one of including and coupled to a corresponding second wireless protocol arrangement via which the wireless communication occurs.

19. The system of claim 18, wherein the plurality of diagnostic processors include at least one portable diagnostic processor and at least one fixed diagnostic processor.

* * * * *